a combustor assembly includes a volute wall extended annularly around a combustor centerline, extended at least partially as a spiral curve from a circumferential reference line around the combustor centerline, and defining a combustion chamber therewithin, an annular inner wall extended at least partially along a lengthwise direction from the volute wall, an annular outer wall extended at least partially along the lengthwise direction from the volute wall, the annular inner wall and the annular outer wall being separated along a radial direction from the combustor centerline, and a primary flow passage being defined between the annular inner wall and the annular outer wall in fluid communication with the combustion chamber, and a flow passage wall extending between a portion of the volute wall and a portion of the annular outer wall.

United States Patent
Boardman et al.

(10) Patent No.: US 10,976,053 B2
(45) Date of Patent: Apr. 13, 2021

(54) INVOLUTE TRAPPED VORTEX COMBUSTOR ASSEMBLY

(71) Applicant: General Electric Company, Schenectady, NY (US)

(72) Inventors: Gregory Allen Boardman, Liberty Township, OH (US); Pradeep Naik, Bangalore (IN); Joseph Zelina, Waynesville, OH (US); Clayton Stuart Cooper, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 434 days.

(21) Appl. No.: 15/793,129

(22) Filed: Oct. 25, 2017

(65) Prior Publication Data

US 2019/0120493 A1    Apr. 25, 2019

(51) Int. Cl.
| | |
|---|---|
| *F23R 3/06* | (2006.01) |
| *F23R 3/58* | (2006.01) |
| *F02C 3/14* | (2006.01) |
| *F23R 3/34* | (2006.01) |
| *F02K 3/077* | (2006.01) |
| *F23R 3/28* | (2006.01) |
| *F23R 3/50* | (2006.01) |

(52) U.S. Cl.
CPC ............. *F23R 3/58* (2013.01); *F02C 3/14* (2013.01); *F02K 3/077* (2013.01); *F23R 3/06* (2013.01); *F23R 3/283* (2013.01); *F23R 3/346* (2013.01); *F23R 3/50* (2013.01); *F05D 2240/127* (2013.01); *F23R 2900/00015* (2013.01)

(58) Field of Classification Search
CPC .... F23R 3/34; F23R 3/346; F23R 3/36; F23R 2900/00015; F23R 3/18; F23R 3/58; F23R 3/52; F23R 3/12; F23C 9/006
See application file for complete search history.

(56) References Cited

U.S. PATENT DOCUMENTS

| 4,586,328 A | 5/1986 | Howald |
| 4,845,941 A | 7/1989 | Paul |
| 4,910,957 A | 3/1990 | Moreno et al. |

(Continued)

FOREIGN PATENT DOCUMENTS

| CN | 103273156 A | 9/2013 |
| CN | 106271214 A | 1/2017 |

*Primary Examiner* — Gerald L Sung
*Assistant Examiner* — Alyson Joan Harrington
(74) *Attorney, Agent, or Firm* — Michele V. Frank; Jacqueline A. DiRamio; Venable LLP (57) ABSTRACT

A combustor assembly includes a volute wall extended annularly around a combustor centerline, extended at least partially as a spiral curve from a circumferential reference line around the combustor centerline, and defining a combustion chamber therewithin, an annular inner wall extended at least partially along a lengthwise direction from the volute wall, an annular outer wall extended at least partially along the lengthwise direction from the volute wall, the annular inner wall and the annular outer wall being separated along a radial direction from the combustor centerline, and a primary flow passage being defined between the annular inner wall and the annular outer wall in fluid communication with the combustion chamber, and a flow passage wall extending between a portion of the volute wall and a portion of the annular outer wall.

18 Claims, 6 Drawing Sheets

(56) References Cited

U.S. PATENT DOCUMENTS

| | | | |
|---|---|---|---|
| 4,928,481 | A | 5/1990 | Joshi et al. |
| 5,165,226 | A | 11/1992 | Newton et al. |
| 5,319,935 | A * | 6/1994 | Toon .................. F23C 6/047 239/403 |
| 5,321,948 | A | 6/1994 | Leonard |
| 5,619,855 | A | 4/1997 | Burrus |
| 6,220,035 | B1 | 4/2001 | Lenertz et al. |
| 6,286,298 | B1 | 9/2001 | Burrus et al. |
| 6,295,801 | B1 | 10/2001 | Burrus et al. |
| 6,412,282 | B1 | 7/2002 | Willis |
| 6,951,108 | B2 | 10/2005 | Burrus et al. |
| 7,003,961 | B2 | 2/2006 | Kendrick et al. |
| 7,260,936 | B2 | 8/2007 | Patel et al. |
| 7,318,317 | B2 | 1/2008 | Carrea |
| 7,416,108 | B2 | 8/2008 | Philip |
| 7,465,423 | B2 | 12/2008 | Raybould et al. |
| 7,653,996 | B2 | 2/2010 | Jungbluth et al. |
| 7,886,539 | B2 | 2/2011 | Cai |
| 7,942,006 | B2 | 5/2011 | Critchley et al. |
| 7,967,183 | B2 | 6/2011 | Goldschmidt et al. |
| 8,141,769 | B2 | 3/2012 | Ott et al. |
| 8,272,219 | B1 | 9/2012 | Johnson et al. |
| 8,555,500 | B2 | 10/2013 | Vossberg et al. |
| 8,701,416 | B2 | 4/2014 | Teets |
| 8,745,989 | B2 | 6/2014 | Prociw et al. |
| 8,776,525 | B2 | 7/2014 | Oechsle |
| 8,864,492 | B2 | 10/2014 | Shi et al. |
| 8,881,965 | B2 | 11/2014 | Stankowski et al. |
| 9,038,392 | B2 | 5/2015 | Yuasa et al. |
| 9,074,773 | B2 | 7/2015 | Boardman et al. |
| 9,151,501 | B2 | 10/2015 | Negulescu |
| 9,222,674 | B2 | 12/2015 | Cunha et al. |
| 9,227,274 | B1 | 1/2016 | Balachandra et al. |
| 9,625,156 | B2 | 4/2017 | Rudrapatna et al. |
| 2002/0043067 | A1* | 4/2002 | Maeda .................. F23R 3/346 60/776 |
| 2002/0069648 | A1* | 6/2002 | Levy .................. F23C 9/006 60/804 |
| 2005/0144956 | A1 | 7/2005 | Alkabie |
| 2008/0041059 | A1* | 2/2008 | Teets .................. F23D 14/66 60/737 |
| 2008/0083224 | A1* | 4/2008 | Varatharajan .......... F23R 3/14 60/748 |
| 2010/0058732 | A1* | 3/2010 | Kaufmann ............. F23C 9/006 60/39.52 |
| 2010/0162710 | A1* | 7/2010 | Senior .................. F23R 3/286 60/737 |
| 2013/0199188 | A1* | 8/2013 | Boardman ............. F23R 3/286 60/737 |
| 2013/0213046 | A1 | 8/2013 | Melton |
| 2017/0050242 | A1 | 2/2017 | Melton |
| 2017/0261964 | A1 | 9/2017 | Meadows et al. |
| 2019/0120491 | A1* | 4/2019 | Boardman ................ F23R 3/58 |

* cited by examiner

INVOLUTE TRAPPED VORTEX COMBUSTOR ASSEMBLY

FIELD

The present subject matter relates generally to combustion assemblies. More particularly, the present subject matter relates to trapped vortex combustor assemblies.

BACKGROUND

Gas turbine engines generally include combustion sections in which compressed air is mixed with a fuel and ignited to generate high pressure, high temperature combustion gases that then flow downstream and expand to drive a turbine section coupled to a compressor section, a fan section and/or a load device. Conventional combustion sections are challenged to burn a variety of fuels of various caloric values. Conventional combustion sections are also challenged to reduce emissions, such as nitric oxides, unburned hydrocarbons, and smoke, while also maintaining or improving combustion stability across a wider range of fuel/air ratios, air flow rates, and inlet pressures. Still further, conventional combustion sections are challenged to achieve any or all of these criteria while maintaining or reducing longitudinal and/or radial dimensions and/or part quantities.

Therefore, there exists a need for a combustion section that may improve emissions output and improve combustion stability across a wider range of fuel/air ratios, air flow rates, and inlet pressures while also reducing combustion section dimensions.

BRIEF DESCRIPTION

Aspects and advantages of the invention will be set forth in part in the following description, or may be obvious from the description, or may be learned through practice of the invention.

A combustor assembly is generally provided. The combustor assembly includes a volute wall extended annularly around a combustor centerline, an annular inner wall extended at least partially along a lengthwise direction from the volute wall, and an annular outer wall extended at least partially along the lengthwise direction from the volute wall. The volute wall is extended at least partially as a spiral curve from a circumferential reference line around the combustor centerline and defines a combustion chamber within the volute wall. The inner wall and the outer wall are separated along a radial direction from the combustor centerline. A primary flow passage is defined between the inner wall and the outer wall in fluid communication from the combustion chamber. A flow passage wall is extended to a portion of the volute wall and a portion of the outer wall. The flow passage wall defines a secondary flow passage and a tertiary flow passage between the volute wall, the outer wall, and the flow passage wall. The secondary flow passage and the tertiary flow passage are each in adjacent circumferential arrangement of one another around the combustor centerline. The volute wall and the outer wall together define one or more secondary outlet openings adjacent to the combustion chamber and in fluid communication with the combustion chamber. The outer wall defines one or more tertiary outlet openings in fluid communication with the tertiary flow passage and the primary flow passage.

In various embodiments, the tertiary outlet opening is defined through a portion of the outer wall outward along a radial direction of the inner wall. In one embodiment, the tertiary outlet opening is defined at one or more locations along a lengthwise direction of the outer wall.

In still various embodiments, the outer wall defines one or more secondary inlet openings in fluid communication with the secondary flow passage and the secondary outlet opening. In one embodiment, the combustor assembly further includes a secondary fuel injector extended at least partially into the secondary flow passage through the secondary inlet opening.

In still yet various embodiments, the outer wall defines one or more tertiary inlet openings in fluid communication with the tertiary flow passage and the tertiary outlet opening. In one embodiment, the combustor assembly further includes a tertiary fuel injector extended at least partially into the tertiary flow passage through the tertiary inlet opening. In another embodiment, the tertiary fuel injector is extended through the tertiary flow passage and the outer wall. The tertiary fuel injector provides a flow of fuel to the primary flow passage.

In various embodiments, the combustor assembly further includes a primary fuel injector in which the volute wall defines one or more fuel injection openings through which the primary fuel injector is extended at least partially into the combustion chamber. In one embodiment, a reference chord is defined from the volute wall. The primary fuel injector is extended at least partially into the combustion chamber at an acute angle relative to the reference chord. In another embodiment, the primary fuel injector is extended at least partially into the combustion chamber at a compound angle relative to the volute wall and the combustor centerline. In still another embodiment, the combustor assembly further includes a secondary fuel injector and a tertiary fuel injector in alternating circumferential arrangement. The secondary fuel injector provides a flow of fuel to the combustion chamber and the tertiary fuel injector provides a flow of fuel to the primary flow passage.

In one embodiment, the flow passage wall extends along the secondary flow passage and the tertiary flow passage, the flow passage wall fluidly segregating the secondary flow passage and the tertiary flow passage.

In another embodiment, the volute wall extends from a first radius disposed approximately at the secondary outlet opening to a second radius disposed approximately at the inner wall. The first radius is greater than the second radius.

In various embodiments, the volute wall defines one or more volute wall openings therethrough in fluid communication with the combustion chamber. In one embodiment, the volute wall defines a volute wall passage extended to the volute wall opening, the volute wall passage extended from a pressure plenum surrounding the volute wall, the inner wall, and the outer wall. In one embodiment, a second reference chord is defined from the volute wall. The volute wall defines the volute wall passage at an acute angle relative to the reference chord.

In another embodiment, the combustor assembly further includes a diffuser case surrounding the volute wall, the inner wall, and the outer wall, the diffuser case. The diffuser case includes an inner diffuser wall defined inward of the inner wall and the volute wall along the radial direction, and an outer diffuser wall defined outward of the outer wall and the volute wall along the radial direction. The diffuser case is extended at least partially along a lengthwise direction and defines a pressure plenum surrounding the volute wall, the outer wall, and the inner wall.

In various embodiments, the combustor assembly further includes a second inner wall disposed inward of the inner wall along the radial direction and a second outer wall disposed outward of the outer wall along the radial direction. The second inner wall is extended at least partially along the lengthwise direction, and wherein an inner cooling flow passage is defined therebetween. The second outer wall is extended at least partially along the lengthwise direction, and wherein an outer cooling flow passage is defined between. In one embodiment, a plurality of orifices is defined through one or more of the volute wall, the inner wall, or the outer wall to provide a portion of a flow of oxidizer to one or more of the combustion chamber or the primary flow passage to affect an exit temperature profile of the combustion gases.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an involute combustor assembly that may improve emissions output and combustion stability are generally provided. The involute combustor assembly embodiments generally provided herein generally defines a trapped vortex combustor. Various embodiments further define a dual-staged toroidally stabilized primary combustion zone at least partially isolated from one or more downstream combustion zones produced by one or more secondary and tertiary fuel injectors. The volute walls of the combustor assembly at least partially partition the primary combustion zone from the one or more combustion zones defined downstream of the primary combustion zone. The involute combustor assembly may generally provide a more compact combustor assembly, thereby decreasing overall gas turbine engine dimensions and weight, and improving gas turbine engine efficiency and performance. The involute combustor assembly may further improve turndown or part-load performance in gas turbine engines and reduce emissions, such as oxides of nitrogen, carbon dioxide, or particulates (e.g., smoke).

Figure 1:
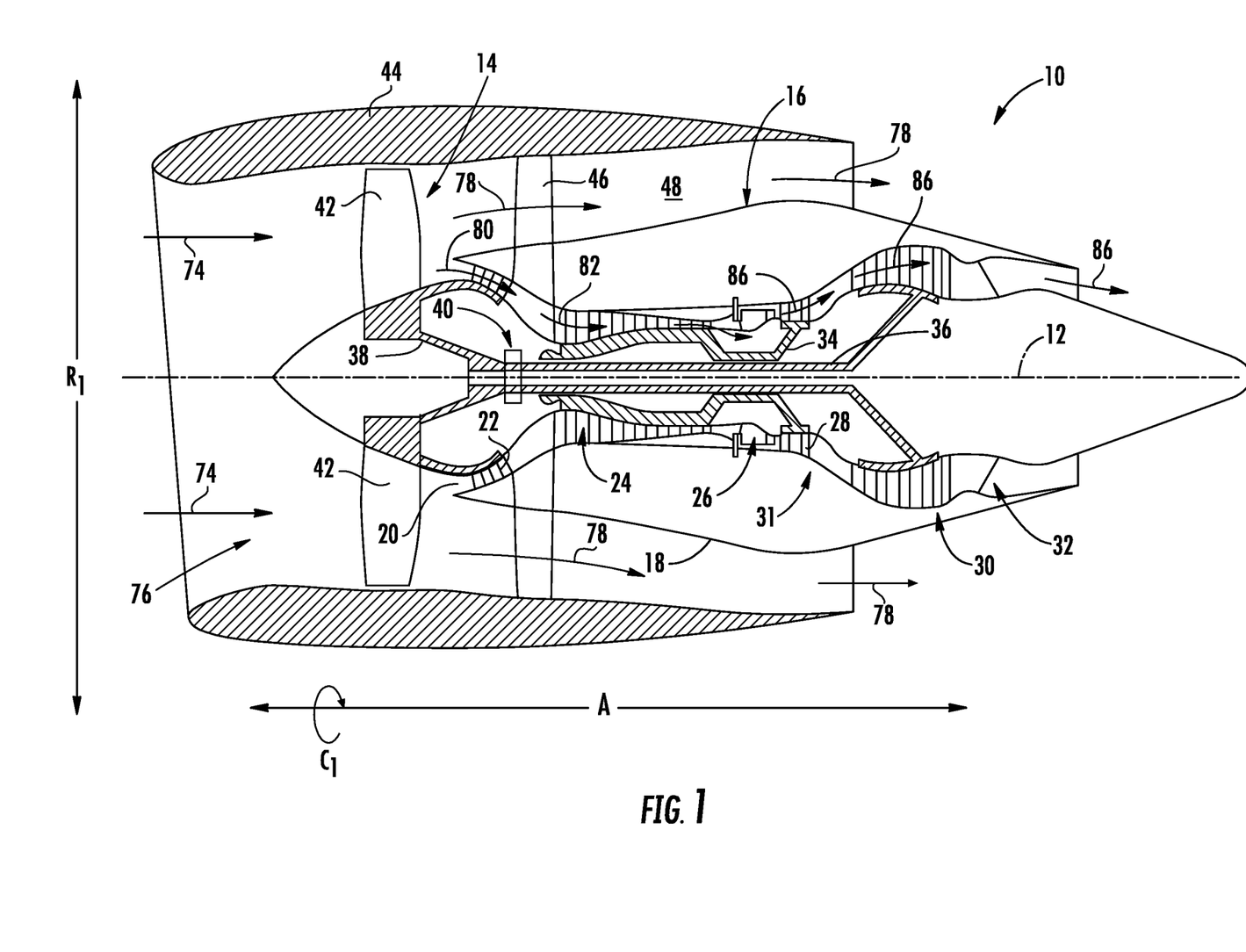
FIG. 1 is a schematic cross sectional view of an exemplary gas turbine engine incorporating an exemplary embodiment of a combustor assembly.

Referring now to the drawings, FIG. 1 is a schematic partially cross-sectioned side view of an exemplary gas turbine engine defining a high by-pass turbofan engine 10 herein referred to as "engine 10" as may incorporate various embodiments of the present disclosure. Although further described below with reference to a turbofan engine, the present disclosure is also applicable to gas turbine engines in general, including turbomachinery in general such as turbojet, turboprop, and turboshaft gas turbine engines, including marine and industrial turbine engines and auxiliary power units. The present disclosure is further applicable to propulsion systems for apparatuses including rockets, missiles, etc., such as ramjets, scramjets, etc. The engine 10 generally defines an axial direction A, a radial direction R1 relative to an axial centerline axis 12 extended there through for reference purposes, and a circumferential direction C1 extended relative to the centerline axis 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
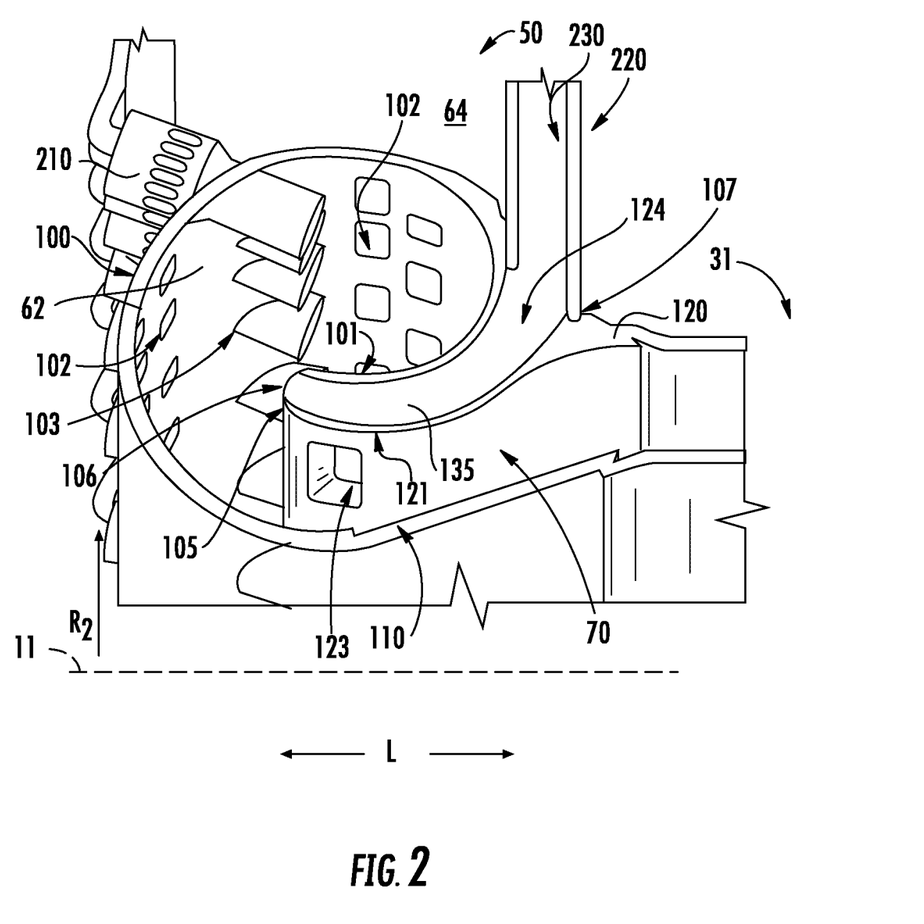
FIG. 2 is an axial cross sectional view of an exemplary embodiment of a combustor assembly of the combustion section of the gas turbine engine generally provided in FIG. 1.

Referring now to FIG. 2, an axial cross sectional view of a combustor assembly 50 of the combustion section 26 is generally provided. The combustor assembly 50 includes a volute wall 100 extended annularly around a combustor centerline 11. The volute wall 100 is extended at least partially as a spiral curve from a circumferential reference line 95 around the combustor centerline 11. The volute wall 100 defines a combustion chamber 62 inward of the volute wall 100. An annular inner wall 110 is extended at least partially along a lengthwise direction L from the volute wall 100. An annular outer wall 120 is extended at least partially along the lengthwise direction L from the volute wall 100. The inner wall 110 and the outer wall 120 are separated along a radial direction R2 from the combustor centerline 11. A primary flow passage 70 is defined between the inner wall 110 and the outer wall 120 in fluid communication from the combustion chamber 62.

It should be appreciated that in various embodiments, the combustor centerline 11 may be the same as the axial centerline 12 of the engine 10. However, in other embodiments, the combustor centerline 11 may be disposed at an acute angle relative to the axial centerline 12. Still further, the combustor centerline 11 may be disposed at a tangent relative to the axial centerline 12. As such, in various embodiments, the lengthwise direction L may be the same as the axial direction A or generally co-directional or co-planar. However, in other embodiments, the lengthwise direction L is defined relative to the disposition of the combustor centerline 11, such as co-directional, which may be defined at a different direction relative to the axial direction A of the engine 10.

In various embodiments, the combustor assembly 50 further includes a primary fuel injector 210. The volute wall 100 defines one or more fuel injection openings 103 through which the primary fuel injector 210 is extended at least partially into the combustion chamber 62. In one embodiment, a reference chord 96 is defined from the volute wall 100. The primary fuel injector 210 is extended at least partially into the combustion chamber 62 at an acute angle 97 relative to the reference chord 96.

In another embodiment, the primary fuel injector 210 is extended at least partially into the combustion chamber 62 at a tangent angle relative to the volute wall 100 and the combustor centerline 11. For example, the primary fuel injector 210 may be disposed at a tangent angle such that a flow of liquid or gaseous fuel is deposited into the combustion chamber 62 at least partially along a circumferential direction C2 relative to the combustor centerline 11 (shown in FIG. 3) within the combustion chamber 62.

In still various embodiments, the primary fuel injector 210 may extend at least partially into the combustion chamber 62 at a compound angle of axial, radial, and azimuthal components relative to the combustion chamber 62.

In various embodiments, the primary fuel injector 210 deposits a flow of liquid or gaseous fuel into the combustion chamber 62 to define a primary combustion zone 61 within the combustion chamber 62. In still various embodiments, the primary fuel injector 210 and the combustion chamber 62 define an annular trapped vortex or toroidally stabilized primary combustion zone 61. The trapped vortex primary combustion zone 61 may be defined stoichiometrically lean or rich. In one embodiment, the fuel at the combustion chamber 62 from the primary fuel injector 210 may be premixed with oxidizer. In another embodiment, the fuel and oxidizer may be separate (i.e., diffusion). In still various embodiments, a combination of diffuser and premixed fuel/oxidizer may enter the primary combustion zone 61 defined in the combustion chamber 62.

Figure 3:
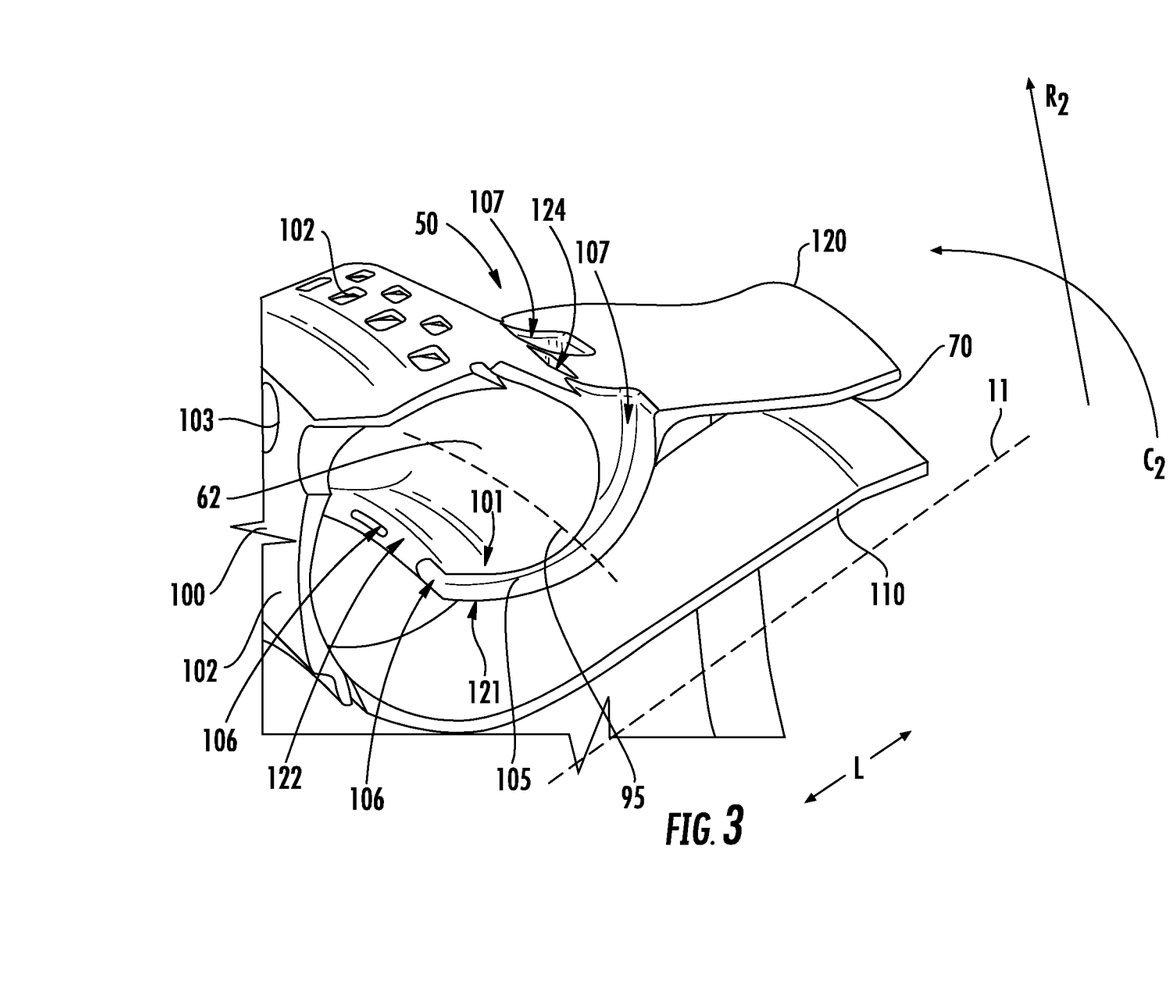
FIG. 3 is a circumferential view of a portion of an exemplary embodiment of the combustor assembly generally provided in FIG. 2.

Referring now to FIG. 3, a perspective view of a portion of the combustor assembly 50 of FIG. 2 is generally provided. Referring to FIGS. 2-3, a portion 101 of the volute wall 100 and a portion 121 of the outer wall 120 together define a secondary flow passage 105 and a tertiary flow passage 135 between the volute wall 100, the outer wall 120, and a flow passage wall 122. The flow passage wall 122 is extended to the portion 101 of the volute wall 100 and the portion 121 of the outer wall 120. The flow passage wall 122, the portion 101 of the volute wall 100, and the portion 121 of the outer wall 120 together define the secondary flow passage 105 and the tertiary flow passage 135 as discrete passages in an adjacent circumferential arrangement around the combustor centerline 11. For example, the flow passage wall 122 may be extended along the secondary flow passage 105 and the tertiary flow passage 135 to fluidly segregate the secondary flow passage 105 and the tertiary flow passage 135.

The volute wall 100 and the outer wall 120 together define one or more secondary outlet openings 106 adjacent to the combustion chamber 62. The second outlet opening 106 is in fluid communication with the primary flow passage 70. In one embodiment, the second outlet opening 106 is more specifically in fluid communication with the combustion chamber 62. The outer wall 120 further defines one or more secondary inlet openings 107 in fluid communication with the secondary flow passage 105 and the secondary outlet opening 106.

Figure 4:
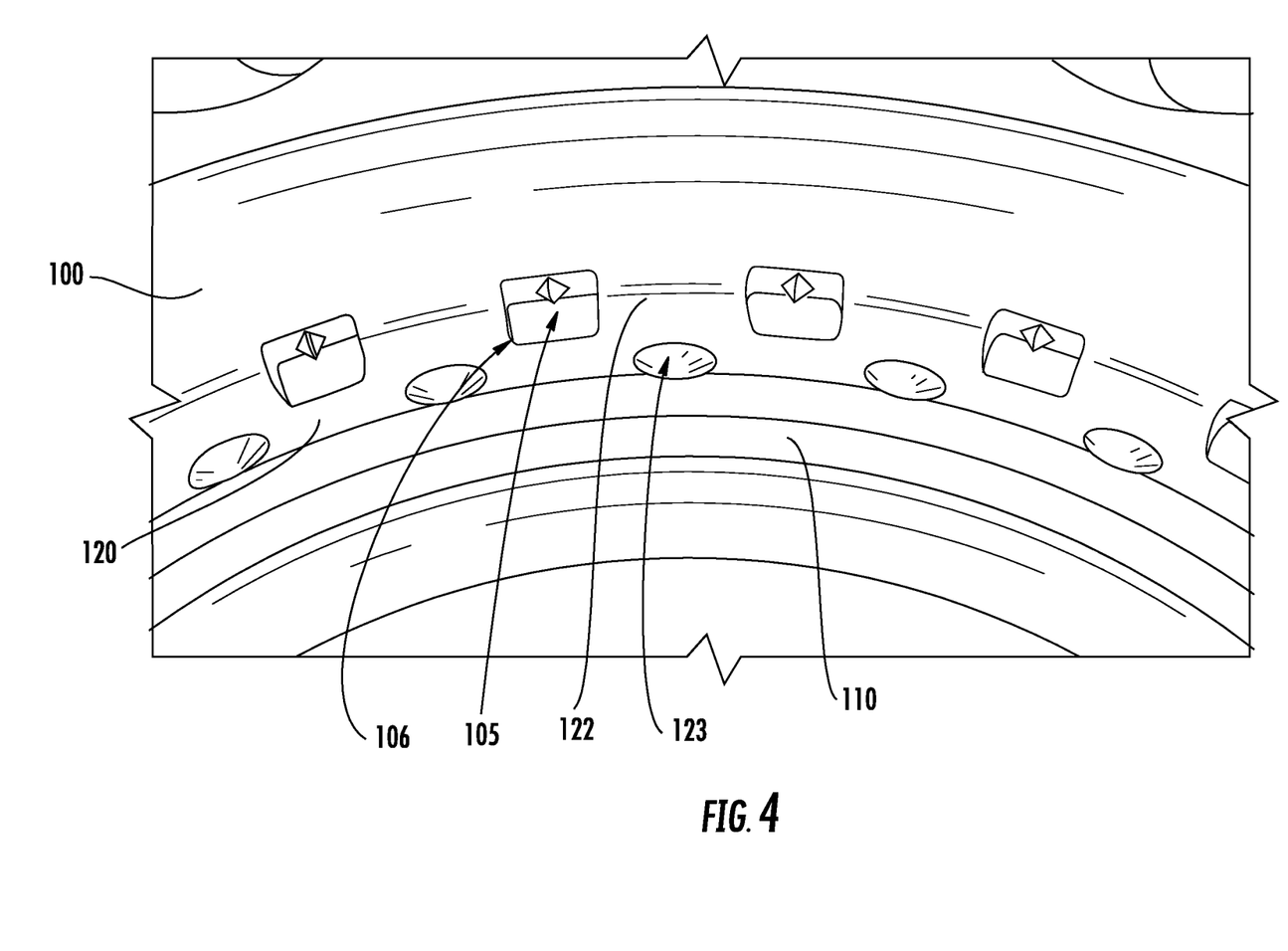
FIG. 4 is a perspective view of a portion of an exemplary embodiment of a combustor assembly of the combustion section of the gas turbine engine generally provided in FIG. 1.

Referring now to FIG. 4, the outer wall 120 defines one or more tertiary outlet openings 123 in fluid communication with the tertiary flow passage 135 and the primary flow passage 70. In one embodiment, the tertiary outlet opening 123 is more specifically defined through the portion 121 of the outer wall 120 outward along the radial direction R2 of the inner wall 110. In various embodiments, the tertiary outlet opening 123 is defined in fluid communication with the primary flow passage 70 downstream of the primary combustion zone 61. The outer wall 120 further defines one or more tertiary inlet openings 124 in fluid communication with the tertiary flow passage 135 and the tertiary outlet opening 123. In various embodiments, the tertiary inlet opening 124 is in an adjacent circumferential arrangement relative to the secondary inlet opening 107 such as depicted in FIG. 3.

In various embodiments, the tertiary outlet opening 123 may further be defined at one or more locations along the lengthwise direction L of the outer wall 120. For example, the tertiary outlet opening 123 may be disposed at a plurality of locations along the lengthwise direction L outward along the radial direction R2 of the inner wall 110. In various embodiments, tertiary outlet openings 123 are disposed from an upstream location proximate to the primary combustion zone 61 toward a downstream end proximate to an exit of the combustor assembly 50.

Referring now to FIGS. 2-5, in one embodiment, the annular trapped vortex primary combustion zone 61 within the combustion chamber 62 is disposed generally outward along the radial direction R2 relative to the primary flow passage 70 extended between the inner wall 110 and the outer wall 120. For example, the combustion chamber 62 is generally stacked and at least partially partitioned from the primary flow passage 70 via the portions 101, 121 of the volute wall 100 and the outer wall 120 extended to define the secondary flow passage 105.

In various embodiments, the secondary flow passage 105 may define a decreasing cross sectional area from approximately the secondary inlet opening 107 to approximately the secondary outlet opening 106. Additionally, or alternatively, in other embodiments, the tertiary flow passage 135 may define a decreasing cross sectional area from approximately the secondary inlet opening 107 to approximately the tertiary outlet opening 123. The decreasing cross sectional area may generally define a nozzle accelerating a flow of fluid through the secondary flow passage 105 and/or tertiary flow passage 135 to the combustion chamber 62. In various embodiments, the flow of fluid is a liquid or gaseous fuel (further described below), a flow of oxidizer (e.g., air), or a flow of inert gas or combinations thereof.

In one embodiment, the secondary flow passage 105, at least in part, may provide a flow of oxidizer to help define at least one passage providing a flow of oxidizer to the volute combustion chamber 62 helping to drive the trapped vortex or toroidal stabilization of the primary combustion zone 61 at the combustion chamber 62.

In another embodiment, such as further discussed below, the combustor assembly 50 further defines one or more fuel injection locations downstream of the primary combustion zone 61 at the combustion chamber 62, such as between the trapped vortex primary combustion zone 61 and a downstream exit of the combustor assembly 50. Similarly as the primary fuel injector 210 and the primary combustion zone 61, the one or more downstream fuel injection locations may be defined as stoichiometrically lean or rich, or combinations thereof. Still further, the one or more fuel injection locations may define a diffusion or premixed fuel and oxidizer, or combinations thereof. In various embodiments, the downstream fuel injector locations further discussed below may be defined as actively-controlled fueled dilution of combustion gases exiting the combustor assembly 50. In still various embodiments, the primary fuel injector 210, one or more of the downstream fuel injectors (e.g., secondary fuel injector 220, tertiary fuel injector 230), or combinations thereof, may be controlled to selectively provide fuel or fuel/oxidizer mixture to the combustion chamber 62, the primary flow passage 70, or both, to provide a desired residence time of the fuel/oxidizer mixture when forming the combustion gases 86.

Figure 5:
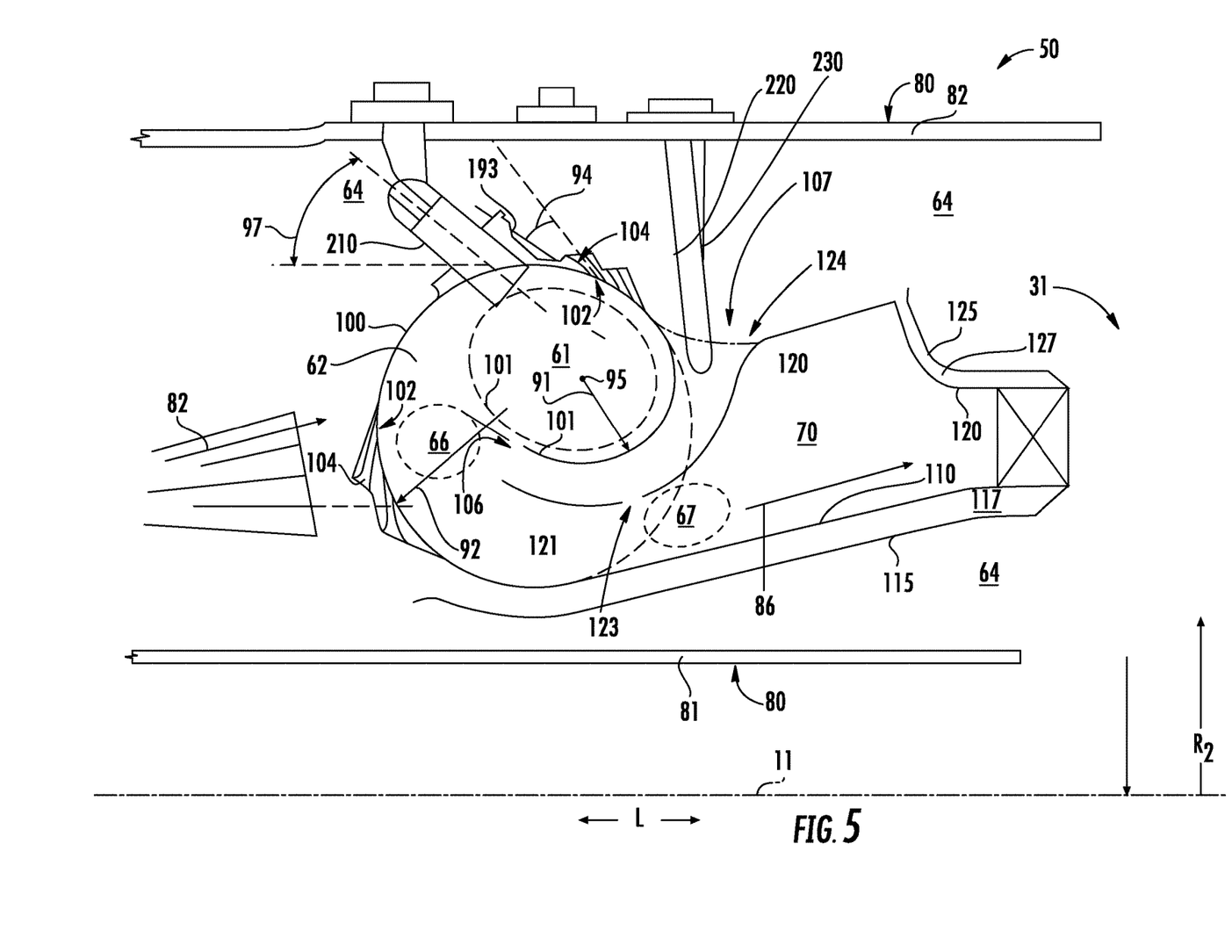
FIG. 5 is an axial cross sectional view of an exemplary embodiment of a combustor assembly of the combustion section of the gas turbine engine generally provided in FIG. 1.

Referring now to FIGS. 2 and 5, an axial cross sectional view of the combustion section 26 is generally provided. In the embodiment shown in FIGS. 2 and 5, the combustor assembly 50 may further include a secondary fuel injector 220 extended at least partially into the secondary flow passage 105 through the secondary inlet opening 107. The secondary fuel injector 220 is configured to deposit a flow of liquid or gaseous fuel into the secondary flow passage 105 to egress into the combustion chamber 62. As such, the secondary flow passage 105 in fluid communication with the primary flow passage 70, or more specifically, the combustion chamber 62, defines a secondary fuel/oxidizer injection port generally downstream (along the primary flow passage 70) of the primary fuel injector 210. The secondary flow passage 105 may egress a fuel into the combustion chamber 62 to mix and ignite to form a secondary combustion zone downstream of the primary combustion zone 61, such as shown schematically at circle 66.

Referring still to FIG. 5, in various embodiments of the combustor assembly 50, the volute wall 100 extends from a first radius 91 disposed approximately at the secondary outlet opening 106 to a second radius 92 disposed approximately at the inner wall 110. The second radius 92 is generally greater than the first radius 91. As such, the volute wall 100 may generally define a scroll wall defining an annular volute combustion chamber 62.

Referring now to FIGS. 2 and 5, in various embodiments, the combustor assembly 50 further includes a tertiary fuel injector 230 extended at least partially through the tertiary outlet opening 123 at the outer wall 120. In one embodiment, the tertiary fuel injector 230 is extended at least partially at a tangent angle relative to the outer wall 120 and the combustor centerline 11, such as to deposit a flow of liquid or gaseous fuel at least partially along the circumferential direction C2 (shown in FIG. 3) relative to the combustor centerline 11. The tertiary fuel injector 230 may egress a flow of fuel into the primary flow passage 70 to mix and ignite to form a tertiary combustion zone downstream of the primary combustion zone 61, such as shown schematically at circle 67.

In various embodiments, the secondary fuel injector 220 and the tertiary fuel injector 230 are together in alternating circumferential arrangement. The secondary fuel injector 220 provides a flow of fuel to the combustion chamber 62 and the tertiary fuel injector 230 provides a flow of fuel to the primary flow passage 70.

Referring now to FIGS. 2-5, in various embodiments, the volute wall 100 defines one or more volute wall openings 102 therethrough in fluid communication with the combustion chamber 62. The volute wall openings 102 permit a flow of oxidizer into the combustion chamber 62 to drive the trapped vortex therewithin. In one embodiment, the vortex-driving oxidizer may be premixed with a fuel separate from the primary fuel injector 210 such as to create an at least partially premixed hybrid trapped vortex zone in the combustion chamber 62.

Referring now to FIG. 5, in still various embodiments, the volute wall 100 defines a volute wall passage 104 extended to the volute wall opening 102. The volute wall passage 104 is extended from a diffuser cavity or pressure plenum 64 (e.g., compressor exit pressure or P3) surrounding the volute wall 100, the inner wall 110, and the outer wall 120. In one embodiment, a second reference chord 93 is defined from the volute wall 100. The volute wall 100 defines the volute wall passage 104 at an acute angle 94 relative to the reference chord 96. In another embodiment, the volute wall passage 104 may define a decreasing cross sectional area from the pressure plenum 64 to the combustion chamber 62 such as to accelerate a flow of oxidizer into the combustion chamber 62. The accelerated flow of oxidizer and/or the acute angle 94 at which the flow of oxidizer enters the combustion chamber 62 may further promote toroidal stabilization of the combustion gases at the primary combustion zone 61 within the combustion chamber 62.

Referring still to FIG. 5, the combustor assembly 50 may further include a second inner wall 115 disposed inward of the inner wall 110 along the radial direction R2. The second inner wall 115 is extended at least partially along the lengthwise direction L. An inner cooling flow passage 117 is defined between the second inner wall 115 and the inner wall 110. The inner cooling flow passage 117 provides a flow of oxidizer from the pressure plenum 64 to downstream of the combustor assembly 50. For example, the inner cooling flow passage 117 may provide a flow of oxidizer from the pressure plenum 64 to a turbine nozzle of a turbine section 31. The inner cooling flow passage 117 may further define fins or nozzles, or varying cross sectional areas, such as to define an inducer accelerating a flow of oxidizer toward the downstream end. The accelerated flow of oxidizer may further provide thermal attenuation or heat transfer to at least one of the inner wall 110, the second inner wall 115, or a downstream component of the engine 10 (e.g., turbine nozzle, turbine rotor, turbine secondary flowpath, etc.).

In another embodiment, the combustor assembly 50 may further include a second outer wall 125 disposed outward of the outer wall 120 along the radial direction R2. The second outer wall 125 is extended at least partially along the lengthwise direction L. An outer cooling flow passage 127 is defined between the outer wall 120 and the second outer wall 125. Similarly as described in regard to the inner cooling flow passage 117, outer cooling flow passage 127 provides a flow of oxidizer from the pressure plenum 64 toward downstream of the combustor assembly 50. For example, the outer cooling flow passage 127 may provide a flow of oxidizer from the pressure plenum 64 to a turbine nozzle of a turbine section 31. The outer cooling flow passage 127 may further define fins or nozzles, or varying cross sectional areas, such as to define an inducer accelerating a flow of oxidizer toward the downstream end.

Referring still to FIG. 5, the combustor assembly 50 may further include a pressure vessel or diffuser case 80 surrounding the volute wall 100, the inner wall 110, and the outer wall 120. The diffuser case 80 includes an inner diffuser wall 81 defined inward of the inner wall 110 and the volute wall 100 along the radial direction R2. An outer diffuser wall 82 is defined outward of the outer wall 120 and the volute wall 100 along the radial direction R2. The diffuser case 80 is extended at least partially along the lengthwise direction L or along the axial direction A. The diffuser case 80 defines the pressure plenum 64 surrounding the volute wall 100, the outer wall 120, and the inner wall 110.

Figure 6:
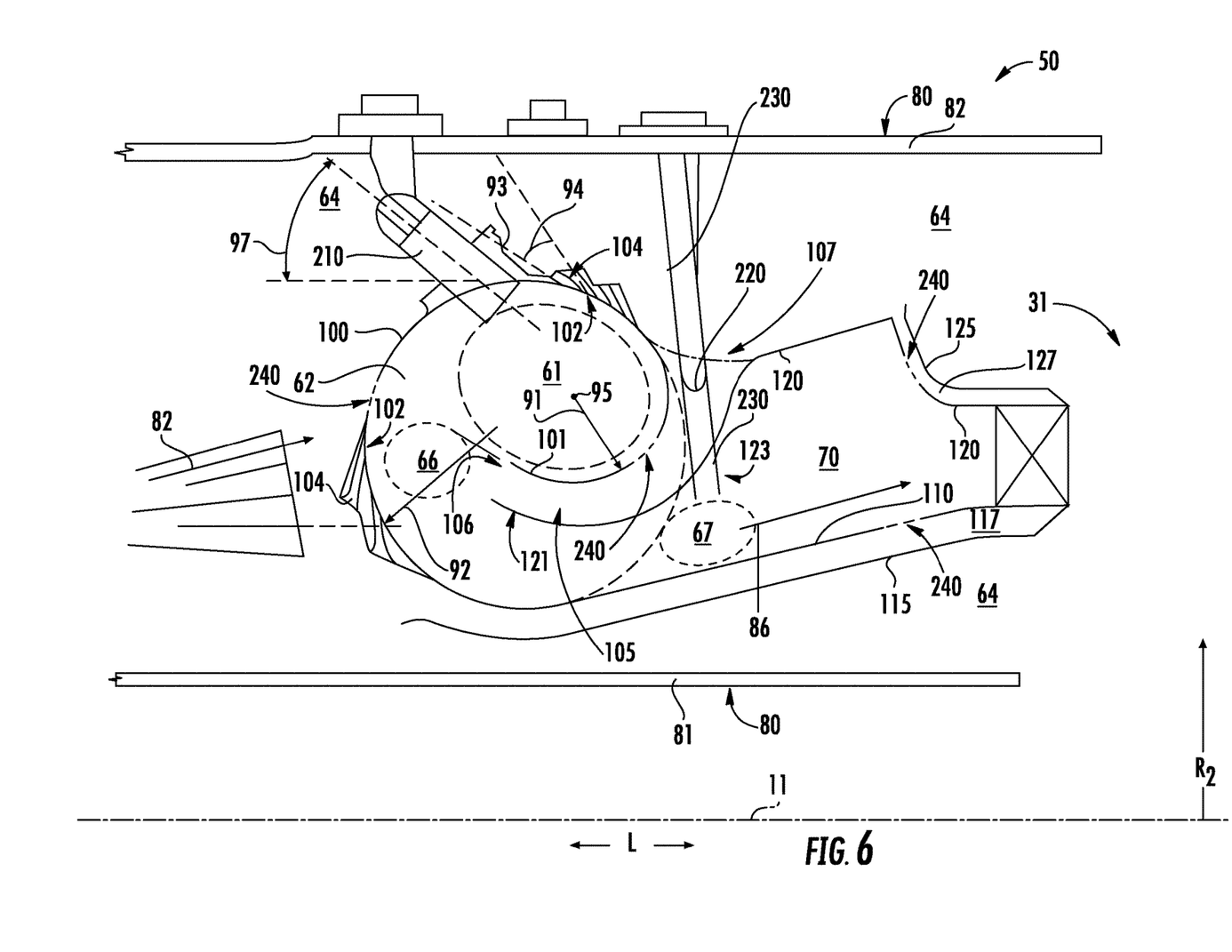
FIG. 6 is an axial cross sectional view of yet another exemplary embodiment of a combustor assembly of the combustion section of the gas turbine engine generally provided in FIG. 1.

Referring now to FIG. 6, another exemplary embodiment of the combustor assembly 50 is generally provided. The embodiment generally provided in FIG. 6 may be configured substantially similarly as generally provided in FIGS. 1-6. However, in FIG. 6, the tertiary fuel injector 230 is extended through the tertiary flow passage 135 and the outer wall 120. The tertiary fuel injector 230 provides a flow of fuel directly into to the primary flow passage 70. A flow of oxidizer may flow through the tertiary flow passage 135 and egress through the tertiary outlet opening 123 such as described in regard to FIGS. 1-6. As such, the tertiary flow passage 135 may provide the flow of oxidizer to provide swirl or mixing to the flow of fuel deposited into the primary flow passage 70 from the tertiary fuel injector 230.

In various embodiments, one or more of the volute wall 100, or the inner wall 110, the outer wall 120 may include a plurality of orifices 240 therethrough to enable a portion of oxidizer to flow from the secondary flow passage 105, the inner cooling passage 117, or the outer cooling passage 127, respectively, or the pressure plenum 64, into the primary flow passage 70 and/or the combustion chamber 62, such as to adjust or affect an exit temperature profile, or circumferential distribution thereof (e.g., pattern factor), of the combustion gases 86. The orifices may define dilution jets, cooling nuggets or louvers, holes, or transpiration. In another embodiment, the plurality of orifices may provide thermal attenuation (e.g., cooling) to one or more of the volute wall 100, the inner wall 110, or the outer wall 120. In still various embodiments, the plurality of orifices 240 may be oriented through one or more of the walls 100, 110, 120 at a straight or generally compound angle relative (e.g., axial, radial, and/or azimuthal).

During operation of the engine 10, as shown in FIGS. 1-6 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

As shown in FIG. 2, the now compressed air as indicated schematically by arrows 82 flows through the combustor assembly 50. A liquid or gaseous fuel is deposited into the combustion chamber 62 via the primary fuel injector 210. The fuel and compressed air 82 are mixed and burned to produce combustion gases 86 (shown in FIG. 1). More specifically, the fuel and air are mixed and ignited in the combustion chamber 62 at the primary combustion zone 61 and toroidally stabilized via the compressed air 82 entering the combustion chamber 62 via the secondary flow passage 105, the volute wall openings 102, or both. In various embodiments, such as shown in FIG. 3, the secondary fuel injector 220 provides additional fuel through the secondary flow passage 105 to further mix with air and combustion gases downstream of the primary combustion zone 61. The combustion gases then flow through the primary flow passage 70 toward the turbine section 31. In various embodiments, the combustor assembly 50 including the tertiary fuel injector 230 further deposits fuel to the primary flow passage 70 to mix with the combustion gases 86 downstream of the primary combustion zone 61.

Referring still to FIGS. 1-6, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

It should be appreciated that, in various embodiments, openings generally defined herein, such as, but not limited to, the volute wall opening 102, the secondary outlet opening 106, the secondary inlet opening 107, and one or passages, such as, but not limited to, the volute wall passage 104 and the secondary flow passage 105, the inner cooling flow passage 117, and the outer cooling flow passage 127, may each define one or more cross sectional areas including, but not limited to racetrack, circular, elliptical or ovular, rectangular, star, polygonal, or oblong, or combinations thereof. Still further, the aforementioned passages may define variable cross sectional areas, such as decreasing, increasing, or combination thereof, such as convergent/divergent. The variable cross sectional areas may define features providing an accelerated flow, changes in pressure, or changes in orientation of flow, such as along a circumferential direction, radial direction, or axial direction, or combinations thereof.

All or part of the combustor assembly may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly 50 separately or integral to one or more other portions of the combustion section 26. Furthermore, the combustor assembly 50 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly, comprising:
   a volute wall extended annularly around a combustor centerline, wherein the volute wall is extended at least partially as a spiral curve from a circumferential reference line around the combustor centerline, and wherein the volute wall defines a combustion chamber therewithin;
   an annular inner wall extended at least partially along a lengthwise direction from the volute wall;
   an annular outer wall extended at least partially along the lengthwise direction from the volute wall, wherein the annular inner wall and the annular outer wall are separated along a radial direction from the combustor centerline, and wherein a primary flow passage is defined between the annular inner wall and the annular outer wall in fluid communication with the combustion chamber; and
   a flow passage wall extending between a portion of the volute wall and a portion of the annular outer wall,
   wherein the flow passage wall defines a secondary flow passage and a tertiary flow passage between the volute wall, the annular outer wall, and the flow passage wall,
   wherein the secondary flow passage and the tertiary flow passage are each in adjacent circumferential arrangement of one another around the combustor centerline,
   wherein the volute wall and the annular outer wall together define at least one secondary outlet opening adjacent to the combustion chamber and in fluid communication therewith,
   wherein the annular outer wall defines at least one tertiary outlet opening in fluid communication with the tertiary flow passage and the primary flow passage,
   wherein the annular outer wall defines at least one secondary inlet opening in fluid communication with the secondary flow passage and the at least one secondary outlet opening, and
   wherein the combustor assembly further comprises a secondary fuel injector extended at least partially into the secondary flow passage through the at least one secondary inlet opening.

2. The combustor assembly of claim 1, wherein the at least one tertiary outlet opening is defined through the portion of the annular outer wall outward along the radial direction from the annular inner wall.

3. The combustor assembly of claim 2, wherein the at least one tertiary outlet opening is defined at at least one location along the lengthwise direction of the annular outer wall.

4. The combustor assembly of claim 1, wherein the annular outer wall defines at least one tertiary inlet opening in fluid communication with the tertiary flow passage and the at least one tertiary outlet opening.

5. A combustor assembly, comprising:
   a volute wall extended annularly around a combustor centerline, wherein the volute wall is extended at least partially as a spiral curve from a circumferential reference line around the combustor centerline, and wherein the volute wall defines a combustion chamber therewithin;
   an annular inner wall extended at least partially along a lengthwise direction from the volute wall;
   an annular outer wall extended at least partially along the lengthwise direction from the volute wall, wherein the annular inner wall and the annular outer wall are separated along a radial direction from the combustor centerline, and wherein a primary flow passage is defined between the annular inner wall and the annular outer wall in fluid communication with the combustion chamber; and
   a flow passage wall extending between a portion of the volute wall and a portion of the annular outer wall,
   wherein the flow passage wall defines a secondary flow passage and a tertiary flow passage between the volute wall, the annular outer wall, and the flow passage wall,
   wherein the secondary flow passage and the tertiary flow passage are each in adjacent circumferential arrangement of one another around the combustor centerline,
   wherein the volute wall and the annular outer wall together define at least one secondary outlet opening adjacent to the combustion chamber and in fluid communication therewith,
   wherein the annular outer wall defines at least one tertiary outlet opening in fluid communication with the tertiary flow passage and the primary flow passage,
   wherein the annular outer wall defines at least one tertiary inlet opening in fluid communication with the tertiary flow passage and the at least one tertiary outlet opening, and
   wherein the combustor assembly, further comprises a tertiary fuel injector extended at least partially into the tertiary flow passage through the at least one tertiary inlet opening.

6. The combustor assembly of claim 5,
   wherein the tertiary fuel injector is extended through the tertiary flow passage and the annular outer wall, and
   wherein the tertiary fuel injector is configured to provide a flow of fuel to the primary flow passage.

7. The combustor assembly of claim 1, further comprising a primary fuel injector, wherein the volute wall defines at least one fuel injection opening through which the primary fuel injector is extended at least partially into the combustion chamber.

8. The combustor assembly of claim 7,
wherein a reference chord is defined from the volute wall, and
wherein the primary fuel injector is extended at least partially into the combustion chamber at an acute angle relative to the reference chord.

9. The combustor assembly of claim 7, wherein the primary fuel injector is extended at least partially into the combustion chamber at a compound angle relative to the volute wall and the combustor centerline.

10. A combustor assembly, comprising:
a volute wall extended annularly around a combustor centerline, wherein the volute wall is extended at least partially as a spiral curve from a circumferential reference line around the combustor centerline, and wherein the volute wall defines a combustion chamber therewithin;
an annular inner wall extended at least partially along a lengthwise direction from the volute wall;
an annular outer wall extended at least partially along the lengthwise direction from the volute wall, wherein the annular inner wall and the annular outer wall are separated along a radial direction from the combustor centerline, and wherein a primary flow passage is defined between the annular inner wall and the annular outer wall in fluid communication with the combustion chamber; and
a flow passage wall extending between a portion of the volute wall and a portion of the annular outer wall,
wherein the flow passage wall defines a secondary flow passage and a tertiary flow passage between the volute wall, the annular outer wall, and the flow passage wall,
wherein the secondary flow passage and the tertiary flow passage are each in adjacent circumferential arrangement of one another around the combustor centerline,
wherein the volute wall and the annular outer wall together define at least one secondary outlet opening adjacent to the combustion chamber and in fluid communication therewith,
wherein the annular outer wall defines at least one tertiary outlet opening in fluid communication with the tertiary flow passage and the primary flow passage,
wherein the combustor assembly further comprises:
a primary fuel injector, and
a secondary fuel injector and a tertiary fuel injector in alternating circumferential arrangement,
wherein the volute wall defines at least one fuel injection opening through which the primary fuel injector is extended at least partially into the combustion chamber, and
wherein the secondary fuel injector is configured to provide a flow of fuel to the combustion chamber and the tertiary fuel injector is configured to provide a flow of fuel to the primary flow passage.

11. The combustor assembly of claim 1, wherein the flow passage wall extends along the secondary flow passage and the tertiary flow passage, the flow passage wall fluidly segregating the secondary flow passage and the tertiary flow passage.

12. The combustor assembly of claim 1, wherein the volute wall extends from a first radius disposed approximately at the at least one secondary outlet opening to a second radius disposed approximately at the annular inner wall, and wherein the second radius is greater than the first radius.

13. The combustor assembly of claim 1, wherein the volute wall defines at least one volute wall opening therethrough in fluid communication with the combustion chamber.

14. The combustor assembly of claim 13, wherein the volute wall defines a volute wall passage extended to the at least one volute wall opening, the volute wall passage extended from a pressure plenum surrounding the volute wall, the annular inner wall, and the annular outer wall.

15. The combustor assembly of claim 14, wherein a second reference chord is defined from the volute wall, and wherein the volute wall defines the volute wall passage at an acute angle relative to the second reference chord.

16. The combustor assembly of claim 1, further comprising a diffuser case surrounding the volute wall, the annular inner wall, and the annular outer wall, the diffuser case comprising an inner diffuser wall defined inward of the annular inner wall and the volute wall along the radial direction, and an outer diffuser wall defined outward of the annular outer wall and the volute wall along the radial direction, and wherein the diffuser case is extended at least partially along a lengthwise direction, the diffuser case defining a pressure plenum surrounding the volute wall, the annular outer wall, and the annular inner wall.

17. The combustor assembly of claim 1, further comprising a second inner wall disposed inward of the annular inner wall along the radial direction and a second outer wall disposed outward of the annular outer wall along the radial direction, wherein the second inner wall is extended at least partially along the lengthwise direction, and wherein an inner cooling flow passage is defined therebetween, and wherein the second outer wall is extended at least partially along the lengthwise direction, and wherein an outer cooling flow passage is defined between.

18. The combustor assembly of claim 17, wherein a plurality of orifices is defined through one or more of the volute wall, the annular inner wall, or the annular outer wall to provide a portion of a flow of oxidizer to one or more of the combustion chamber or the primary flow passage to affect an exit temperature profile of combustion gases.

* * * * *